(12) United States Patent
Chen et al.

(10) Patent No.: US 12,113,459 B2
(45) Date of Patent: Oct. 8, 2024

(54) SELF-POWERED SENSING METHOD AND SENSING DEVICE FOR SPHEROIDAL ROBOT

(71) Applicant: SOOCHOW UNIVERSITY, Suzhou (CN)

(72) Inventors: Tao Chen, Suzhou (CN); Junchen Fu, Suzhou (CN); Zhiying Huang, Suzhou (CN); Kejian Ni, Suzhou (CN); Xiandong Tian, Suzhou (CN); Yuxiang Tian, Suzhou (CN); Lining Sun, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 403 days.

(21) Appl. No.: 17/778,834

(22) PCT Filed: Jul. 8, 2021

(86) PCT No.: PCT/CN2021/105127
§ 371 (c)(1),
(2) Date: May 21, 2022

(87) PCT Pub. No.: WO2022/213501
PCT Pub. Date: Oct. 13, 2022

(65) Prior Publication Data
US 2023/0029538 A1   Feb. 2, 2023

(30) Foreign Application Priority Data
Apr. 9, 2021   (CN) .......................... 202110383696.0

(51) Int. Cl.
*H02N 1/04* (2006.01)
*B25J 19/02* (2006.01)
(Continued)

(52) U.S. Cl.
CPC ................ *H02N 1/04* (2013.01); *B25J 19/02* (2013.01); *B62D 57/02* (2013.01); *G01C 23/00* (2013.01)

(58) Field of Classification Search
CPC ....................................................... H02N 1/04
(Continued)

(56) References Cited

FOREIGN PATENT DOCUMENTS

| CN | 102393745 A | 3/2012 |
| CN | 104802871 | * 7/2015 |

(Continued)

*Primary Examiner* — Stanley Tso
(74) *Attorney, Agent, or Firm* — SZDC Law PC

(57) ABSTRACT

The present application discloses a self-powered sensing method and sensing device for spheroidal robot, which belongs to the technical field of robot attitude sensing. The design feature is structure of the spheroidal robot, comprises: a spheroidal object (1) and 26 electrode groups (2); the spheroidal object (1) includes 18 regular octagonal surfaces, 8 regular hexagonal surfaces and 24 quadrilateral surfaces; the electrode group (2) is arranged on each regular octagonal surface and each regular hexagonal surface; the electrode group (2) includes a first outer layer semicircular ring electrode (2-1), a second outer layer semicircular ring electrode (2-2) and an inner ring electrode (2-3). The present invention aims to provide a self-powered sensing method and sensing device for spheroidal robot to sense the posture of the spheroidal robot.

6 Claims, 4 Drawing Sheets

(51) Int. Cl.
*B62D 57/02* (2006.01)
*G01C 23/00* (2006.01)

(58) Field of Classification Search
USPC .......................................................... 174/520
See application file for complete search history.

(56) References Cited

FOREIGN PATENT DOCUMENTS

| | | | |
|---|---|---|---|
| CN | 104802871 | A | 7/2015 |
| CN | 105991064 | A | 10/2016 |
| CN | 106032980 | A | 10/2016 |
| CN | 109470394 | A | 3/2019 |
| CN | 111006795 | A | 4/2020 |
| CN | 112072949 | A | 12/2020 |
| JP | 2004306921 | A | 11/2004 |

* cited by examiner regular octagonal surface          regular hexagonal surface

SELF-POWERED SENSING METHOD AND SENSING DEVICE FOR SPHEROIDAL ROBOT

CROSS REFERENCE TO RELATED APPLICATIONS

This application is the National Stage Application of PCT/CN2021/105127, filed on Jul. 8, 2021, which claims priority of Chinese Patent Application No. 202110383696.0, filed Apr. 9, 2021, the entire contents of which are incorporated herein by reference.

FIELD OF THE INVENTION

The disclosure relates to the field of robot attitude sensing, and particularly relates to a self-powered sensing method and sensing device for spheroidal robot.

DESCRIPTION OF THE PRIOR ART

The spherical motion robot, whose motion mode is mainly rolling, is an independent motion body with spherical enclosure. This special motion mode and enclosure make the spherical robot different from the previously known wheeled or orbital robots. The spherical robot has a unique advantage in steering, which can be more flexible than other motion robots: the spherical object can quickly adjust the operation state to carry on a continuous operation when the movement mechanism is under dangerous conditions such as high-altitude falling; the spherical object has strong recovery capability when colliding with obstacles or other movement mechanism during the detection process. In addition, since the rolling resistance of the sphere is much smaller than that of the sliding or wheeled devices, the spherical robot has the advantages of high efficiency and small energy loss.

However, the spherical motion robot also has disadvantages: the stability of the spherical robot is poor since a point contact is provided between the spherical robot and contact surface during the motion. During the process of climbing and overcoming obstacles, it is difficult for the spherical robot to restore its original movement trajectory after being affected by external disturbance. In the process of climbing and overcoming obstacles, it is difficult to restore the original trajectory after being disturbed by the outside world.

In addition, due to the structure of the spherical robot, the energy device must be arranged inside the spherical robot. Under the circumstance that the internal space of the spherical robot is small, to ensure sufficient energy supply, it is necessary to increase the capacity of the battery, which makes the battery take up too much space and brings additional consumption. In this case, the design difficulty of the spherical robot will be greatly reduced without arranging energy supply in the sensing system of the spherical robot.

SUMMARY OF THE INVENTION

The present invention aims to provide a self-powered sensing method and sensing device for spheroidal robot to overcome the shortage of prior art.

The technical scheme of the present invention is as follows:
a self-powered sensing method and sensing device for spheroidal robot, characterized in that, the self-powered sensing device comprises: a spheroidal object (1) and 26 electrode groups (2);

the spheroidal object (1) includes 18 regular octagonal surfaces, 8 regular hexagonal surfaces and 24 quadrilateral surfaces;

the electrode group (2) is arranged on each regular octagonal surface and each regular hexagonal surface;

the electrode group (2) includes a first outer layer semicircular ring electrode (2-1), a second outer layer semicircular ring electrode (2-2) and an inner ring electrode (2-3).

The structure of the first electrode includes: a metallic triboelectric electrode layer Al (3), an air gap (4), a triboelectric layer PTFE (5) and an insulating layer PI (6) arranged in sequence; wherein, the metallic triboelectric electrode Al (3) is connected with the spheroidal object (1). When in operation, the air gap (4) disappears and the metallic triboelectric electrode layer Al (3) contacts with the triboelectric layer PTFE (5). When not in operation, the air gap (4) is formed and the two triboelectric layers are separated.

The structure of the second electrode includes: a metallic triboelectric electrode layer Al (3), an air gap (4), cotton (7) and an insulating layer PI (6) arranged in sequence; wherein, the metallic triboelectric electrode Al (3) is connected with the spheroidal object (1). When in operation, the air gap (4) disappears and the metallic triboelectric electrode layer Al (3) contacts with the cotton (7). When not in operation, the air gap (4) is formed and the metallic triboelectric electrode layer Al (3) is separated from the cotton (7).

The third electrode is provided with featureless signal type.

The electrode codes of the first outer layer semicircular ring electrode (2-1), the inner ring electrode (2-3) and the second outer layer semicircular ring electrode (2-2) are represented by x, y and z, respectively:

wherein, x represents the electrode type of the first outer layer semicircular ring electrode (2-1), y represents the electrode type of the inner ring electrode (2-3), and z represents the electrode type of the second outer layer semicircular ring electrode (2-2).

1 indicates the choice of the first electrode, 0 indicates the choice of the third electrode, and −1 indicates the choice of the second electrode.

The electrode codes of the 26 electrode groups of the spheroidal object (1) are as follows:
0,0,1;
0,0,−1;
0,1,0;
0,1,1;
0,1,−1;
0,−1,0;
0,−1,1;
0,−1,−1;
1,0,0;
1,0,1;
1,0,−1;
1,1,0;
1,1,1;
1,1,−1;
1,−1,0;
1,−1,1;
1,−1,−1;
−1,0,0;
−1,0,1;
−1,1,0;
−1,1,1;
−1,1,−1;
−1,−1,0;

−1,−1,1;
−1,−1,−1.

Further, the three electrodes in each of the electrode group have their own corresponding bus.

Further, the electrode group (2) is selected from one, two or three of three electrodes with different feature signal types.

The electrodes with different feature signal types includes: the first electrode, the second electrode and the third electrode.

The electrode codes of the first outer layer semicircular ring electrode (2-1), the inner ring electrode (2-3) and the second outer layer semicircular ring electrode (2-2) are represented by x, y and z, respectively:

wherein, x represents the electrode type of the first outer layer semicircular ring electrode (2-1), y represents the electrode type of the inner ring electrode (2-3), and z represents the electrode type of the second outer layer semicircular ring electrode (2-2).

1 indicates the choice of the first electrode, 0 indicates the choice of the third electrode, and −1 indicates the choice of the second electrode.

The electrode codes of the 26 electrode groups are not repeated.

The beneficial effect of the present invention:

Firstly, the disadvantages of the spherical robot are as follows: the stability of the spherical robot is poor since a point contact is provided between the spherical robot and contact surface during the motion. During the process of climbing and overcoming obstacles, it is difficult for the spherical robot to restore its original movement trajectory after being affected by external disturbance. In the process of climbing and overcoming obstacles, it is difficult to restore the original trajectory after being disturbed by the outside world. Therefore, this application provides a spheroidal object, changing the smooth surface of the sphere into a surface composed of multiple planes to make the point contact turn into surface contact, can greatly improve the stability of the spheroidal robot.

Secondly, for the sensing device of the present application, the conventional technology is to detect at least 26 surfaces of the spheroidal robot, namely the control device needs to detect 26 signal channels, which is highly unstable.

In view of the above problems, the core idea of the present application is as follows: providing a new layout manner of triboelectric electrode area, which adopts the principle of triboelectricity to realize self-powering. PTFE-Al and cotton-Al are two electrode structure provided by the device based on the principle of triboelectricity to obtain two different feature signals. The three feature signals, PTFE-Al feature signal, non-feature signal and cotton-Al feature signal, are encoded by 1, 0, −1 and obtain a total of 27 encoding methods, which is able to recognize the position of the surface of the spheroidal robot, so as to identify the geometric posture characteristics and movement trajectory of the spheroidal robot.

The markings in the diagrams are explained as follows:
spheroidal object (1), electrode group (2);
the first outer layer semicircular ring electrode (2-1), the second outer layer semicircular ring electrode (2-2), the inner ring electrode (2-3);
the metallic triboelectric electrode layer Al (3), the air gap (4), the triboelectric layer PTFE (5), the insulating layer PI (6), the cotton (7).

DESCRIPTION OF THE SPECIFIC EMBODIMENTS

Embodiment 1

Figure 1:
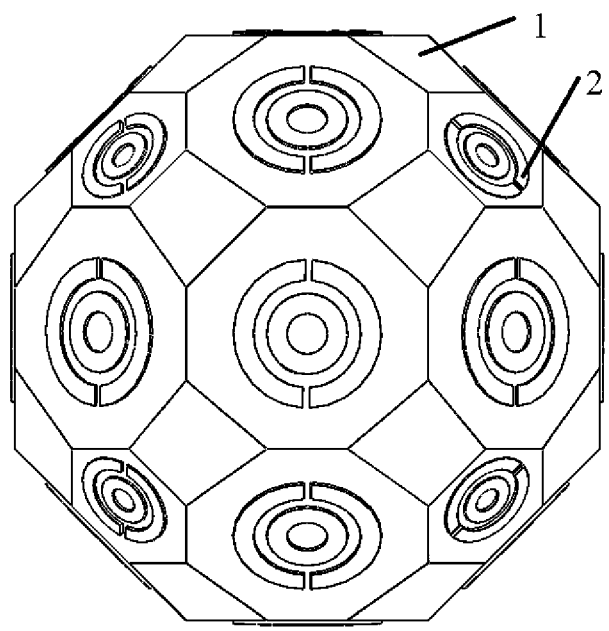
FIG. 1 is a schematic diagram of the spheroidal object and electrode group.
Figure 2:
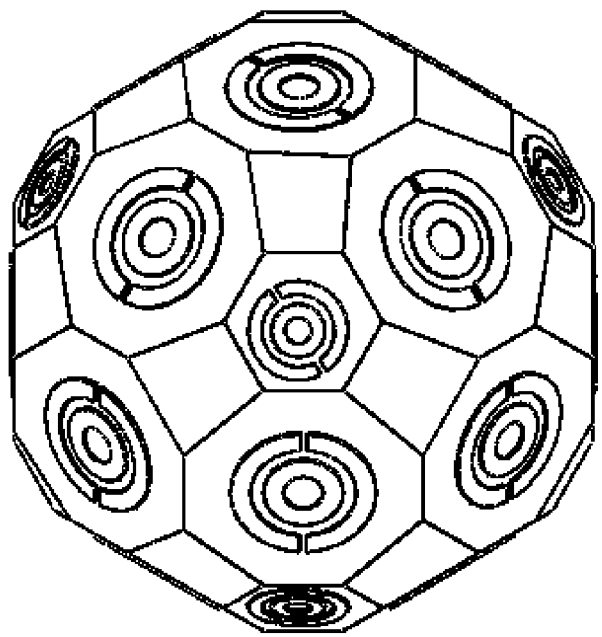
FIG. 2 is a schematic diagram of the spheroidal object and electrode group from another perspective.

The FIG. 1 and FIG. 2 show a self-powered sensing method and sensing device for spheroidal robot, the spheroidal robot comprises the spheroidal object (1) and the electrode group (2). The spheroidal object (the seal-ball shown in the figures) is composed of 18 regular octagonal surfaces, 8 regular hexagonal surfaces and 24 quadrilateral surfaces (the spheroidal object is formed by cutting a sphere). The electrode group (2) is arranged on each of the 18 regular octagonal surfaces and each of the 8 regular hexagonal surfaces (i.e., 26 surfaces are provided with electrode).

Three electrodes, which are the first outer layer semicircular ring electrode (2-1), the second outer layer semicircular ring electrode (2-2) and the inner ring electrode (2-3), are arranged on each of the 18 regular octagonal surfaces and each of the 8 regular hexagonal surfaces.

Figure 3:
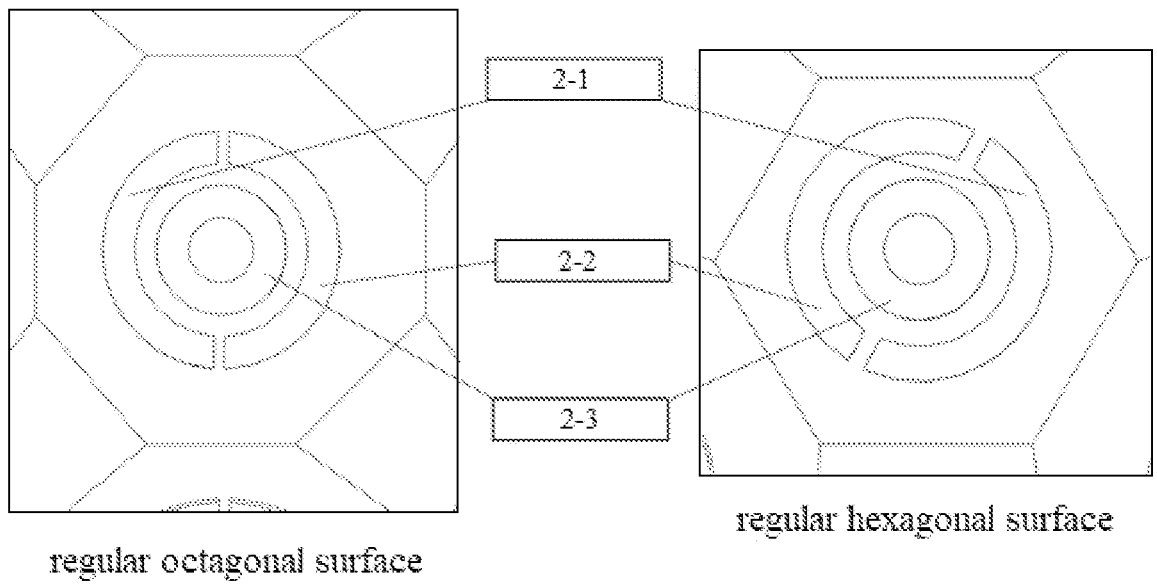
FIG. 3 is a schematic diagram of the electrode group.

FIG. 3 illustrates the shape of the three electrodes: electrodes arranged on the regular octagonal surface are shown in the left drawing of FIG. 3, and electrodes arranged on the regular hexagonal surface are shown in the right drawing of FIG. 3.

The first outer layer semicircular ring electrode (2-1), the second outer layer semicircular ring electrode (2-2) and the inner ring electrode (2-3) on all the surfaces to be detected, are respectively connected to the first bus, the second bus and the third bus.

The follows three electrode designs are proposed for the first outer layer semicircular ring electrode (2-1), the second outer layer semicircular ring electrode (2-2) and the inner ring electrode (2-3).

The First Electrode

Figure 4:
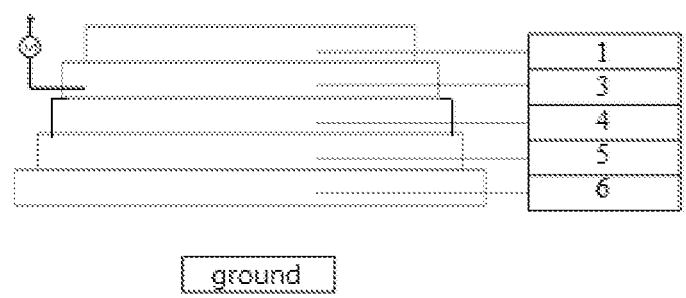
FIG. 4 is a schematic diagram of the structure of the first electrode (PTFE-Al).

As shown in FIG. 4, the first electrode includes the metallic triboelectric electrode layer Al (3), the air gap (4), the triboelectric layer PTFE (5) and the insulating layer PI (6) arranged from top to bottom.

The spheroidal object (1) is arranged above the metallic triboelectric electrode layer Al (3).

With the above electrode scheme, due to gravity and spheroidal structure, when the spheroidal object (1) rolls on the ground, a regular octagonal surface or a regular hexagonal surface of the spheroidal object (1) is always in contact with the ground to make the device stably stay on the plane (the quadrilateral surfaces cannot be stable after testing, so the electrodes are not arranged on the quadrilateral surfaces). These surfaces in contact with the ground is called the working surface.

The electrodes on the working surfaces: the air gap (4) disappears and the metallic triboelectric electrode layer Al (3) contacts with the triboelectric layer PTFE (5).

The electrodes on the non-working surfaces: the air gap (4) is formed and the two triboelectric layers are separated.

Figure 5:
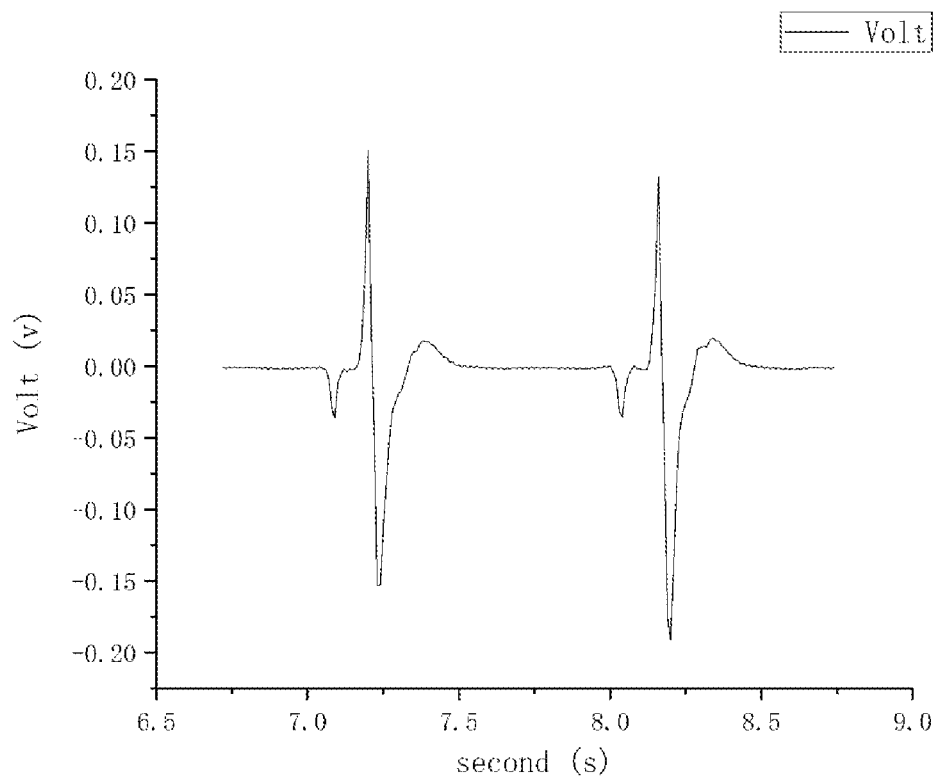
FIG. 5 is a feature signal diagram of the first electrode.

In the contact and separation process between the metallic triboelectric electrode layer Al (3) and the triboelectric layer PTFE (5) mentioned above, the feature signal (oscilloscope test feature signal) as shown in FIG. 5 can be generated according to different materials. The feature signal comes from the metallic triboelectric electrode layer Al (3), is led out by wire and generated after being tested by oscilloscope.

The Second Electrode

Figure 6:
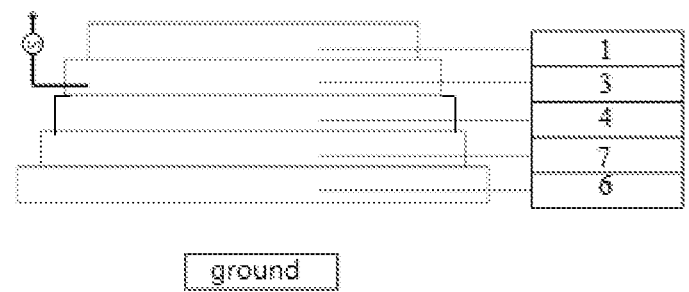
FIG. 6 is a schematic diagram of the structure of the second electrode (cotton-Al).
Figure 7:
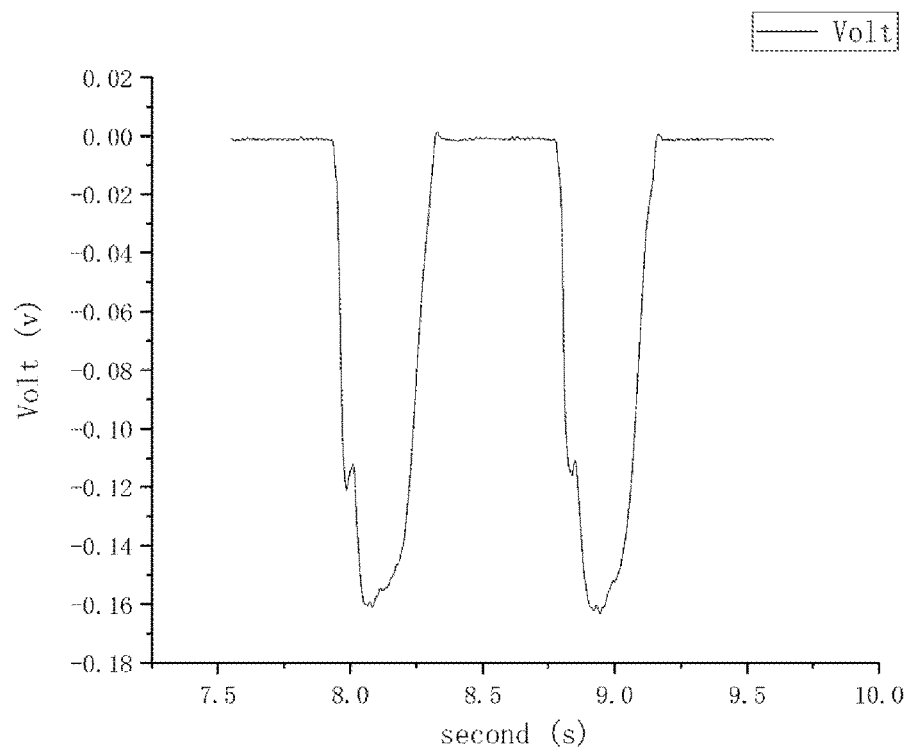
FIG. 7 is a feature signal diagram of the second electrode.

FIG. 6 shows the electrode layer structure of the second electrode (structure as cotton-Al), which is distinguished from the electrode layer structure of the first electrode structure in FIG. 4 by replacing PTFE with cotton (7), and FIG. 7 shown the feature signal of the second electrode.

The Third Electrode

The third electrode is provided with featureless signal.

Figure 8:
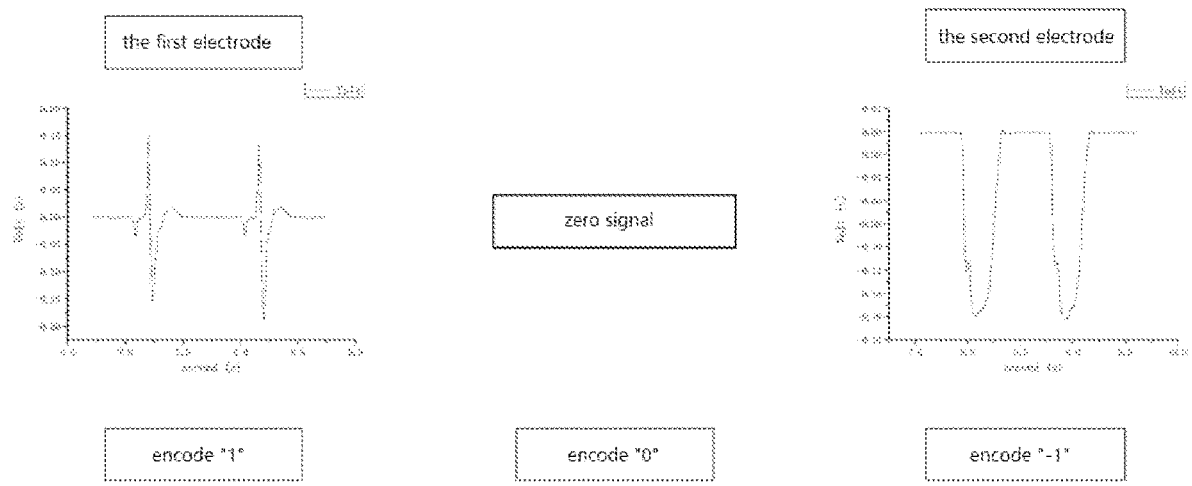
FIG. 8 is the corresponding encoding diagram of the electrodes.

FIG. 8 shows the corresponding codes of the three electrodes, and the specific encoding method is as follows:

As shown in FIG. 3, three electrode regions are arranged on each surface requiring sensing detection. Three corresponding electrode structures are optional for each electrode group, that is, the code of each electrode region can be 1, 0, or −1. It is able to find that there are a total of 3*3*3=27 encoding methods to be aligned and combined.

Encode 26 Surfaces

Since the code 0,0,0 is not used due to the confliction with the unemployable quadrilateral surfaces, the other 26 codes correspond to the 26 regular octagonal surfaces or regular hexagonal surfaces requiring sensing detection. That is, the corresponding code of the first surface is 0,0,−1; the corresponding code of the second surface is 0,0,1; so on the corresponding code of the 26th surface is 1,1,1 (namely, the first outer layer semicircular ring electrode (2-1), the second outer layer semicircular ring electrode (2-2) and the inner ring electrode (2-3) all use the first electrode).

The code number is represented by x, y and z, wherein, x represents the electrode type of the first outer layer semicircular ring electrode (2-1), y represents the electrode type of the inner ring electrode (2-3), and z represents the electrode type of the second outer layer semicircular ring electrode (2-2).

As explained in FIG. 8:

1 indicates the choice of the first electrode; 0 indicates the choice of the third electrode; −1 indicates the choice of the second electrode.

The above scheme is also one of the core invention ideas of this application, there are 27 methods in total to arrange the three different electrodes in one surface (namely the electrode group) according to the permutation and combination (there will be 64 methods if 3 electrodes are arranged on each of the 4 different electrodes).

There are 26 surfaces for arranging the electrodes in this application.

Therefore, the remaining 26 methods correspond exactly to the 26 surfaces for arranging the electrodes, that is, the electrodes on each surface are arranged in different methods.

Which means the type and the number of the electrodes explicit the configuration methods of the electrodes.

Meanwhile, stability of the spheroidal object should be taken into account when arranging electrodes on the spheroidal object (for example, changing the spheroidal object to 64 surfaces is of no great significance), the same as the selection of the surfaces for arranging the electrodes.

Meanwhile, the number of configuration methods of the electrodes (excluding the case where only the third electrodes are arranged) should be ensure to be the same as the number of surfaces for arranging electrodes of the spheroidal object.

Therefore, in this application, the type of the electrodes, the number of the electrodes on each surface and the number of the surfaces for arranging electrodes of the spheroidal object are coordinated with each other.

Since three electrodes correspond to three buses (i.e., each electrode group corresponds to three buses), the control device only needs to monitor three signal channels to get the information of each surface. For example, when the 26th surface locates between the spheroidal object and the ground, which means the 26th is in operation, the control device is able to obtain code of 1,1,1 in the three signal channels; when the second surface is in operation, the control device is able to obtain code of 0,0,1. In this way, it is able to obtain the movement trajectory and current pose characteristics of the spheroidal robot when rolling from the 26th to the second surface.

It should be noted that the test methods in FIG. 5 and FIG. 7 are as follows:

For the first and second electrode structures, the wire is led from the metallic triboelectric electrode layer Al (3) and input to the receiver end of the oscilloscope. When the electrode structure is stressed, the waveforms shown in FIG. 5 and FIG. 7 will be obtained.

The structure of the electrode layer: cotton-Al, and the range of the voltage output range is 0 to −0.16V; PTFE-Al, the range of the voltage output is +0.16V to −0.16V.

The foregoing are merely the preferred embodiments of the present invention, but not intended to limit the patent scope of the invention. Any equivalent structure or equivalent procedure transformation made by means of the description and the attached drawings of the present invention, or directly or indirectly operating in other relevant arts shall pertain to the scope of patent protection of the present invention.

The invention claimed is:

1. A self-powered sensing method and sensing device for spheroidal robot, characterized in that, the self-powered sensing device comprises: a spheroidal object and 26 electrode groups;

the spheroidal object includes 18 regular octagonal surfaces, 8 regular hexagonal surfaces and 24 quadrilateral surfaces;

the electrode group is arranged on each regular octagonal surface and each regular hexagonal surface;

the electrode group includes a first outer layer semicircular ring electrode, a second outer layer semicircular ring electrode and an inner ring electrode;

the electrode group is selected from one, two or three of three electrodes with different feature signal types;

the electrodes with different feature signal types includes: the first electrode, the second electrode and the third electrode;

the electrode codes of the first outer layer semicircular ring electrode, the inner ring electrode and the second outer layer semicircular ring electrode are represented by x, y and z, respectively;

x represents the electrode type of the first outer layer semicircular ring electrode, y represents the electrode type of the inner ring electrode, and z represents the electrode type of the second outer layer semicircular ring electrode;

1 indicates the choice of the first electrode, 0 indicates the choice of the third electrode, and −1 indicates the choice of the second electrode; and the electrode codes of the 26 electrode groups are not repeated.

2. The self-powered sensing method and sensing device for spheroidal robot as described in claim 1, characterized in that, the structure of the first electrode includes: a metallic triboelectric electrode layer Al, an air gap, a triboelectric layer PTFE and an insulating layer PI arranged in sequence; wherein, the metallic triboelectric electrode Al is connected with the spheroidal object; when in operation, the air gap disappears and the metallic triboelectric electrode layer Al contacts with the triboelectric layer PTFE; when not in operation, the air gap is formed and the two triboelectric layers are separated.

3. The self-powered sensing method and sensing device for spheroidal robot as described in claim 1, characterized in that, the structure of the second electrode includes: a metallic triboelectric electrode layer Al, an air gap, cotton and an insulating layer PI arranged in sequence; wherein, the metallic triboelectric electrode Al is connected with the spheroidal object; when in operation, the air gap disappears and the metallic triboelectric electrode layer Al contacts with the cotton; when not in operation, the air gap is formed and the metallic triboelectric electrode layer Al is separated from the cotton.

4. The self-powered sensing method and sensing device for spheroidal robot as described in claim 3, characterized in that, the third electrode is provided with featureless signal type.

5. A self-powered sensing method and sensing device for spheroidal robot, characterized in that, the self-powered sensing device comprises: a spheroidal object and 26 electrode groups;

the spheroidal object includes 18 regular octagonal surfaces, 8 regular hexagonal surfaces and 24 quadrilateral surfaces;

the electrode group is arranged on each regular octagonal surface and each regular hexagonal surface;

the electrode group includes a first outer layer semicircular ring electrode, a second outer layer semicircular ring electrode and an inner ring electrode;

the electrode codes of the first outer layer semicircular ring electrode, the inner ring electrode and the second outer layer semicircular ring electrode are represented by x, y and z, respectively;

x represents the electrode type of the first outer layer semicircular ring electrode, y represents the electrode type of the inner ring electrode, and z represents the electrode type of the second outer layer semicircular ring electrode;

1 indicates the choice of the first electrode, 0 indicates the choice of the third electrode, and −1 indicates the choice of the second electrode;

the electrode codes of the 26 electrode groups of the spheroidal object are as follows:

0,0,1;
0,0,−1;
0,1,0;
0,1,1;
0,1,−1;
0,−1,0;
0,−1,1;
0,−1,−1;
1,0,0;
1,0,1;
1,0,−1;
1,1,0;
1,1,1;
1,1,−1;
1,−1,0;
1,−1,1;
1,−1,−1;
−1,0,0;
−1,0,1;
−1,0,−1;
−1,1,0;
−1,1,1;
−1,1,−1;
−1,−1,0;
−1,−1,1;
−1,−1,−1.

6. The self-powered sensing method and sensing device for spheroidal robot as described in claim 1, characterized in that, the three electrodes in each of the electrode group have their own corresponding bus.

* * * * *